United States Patent
Kuhlefelt (10) Patent No.: US 9,853,389 B2
(45) Date of Patent: Dec. 26, 2017

(54) HIGH-VOLTAGE CABLE PLUG (71) Applicant: PFISTERER KONTAKTSYSTEME GMBH, Winterbach (DE)

(72) Inventor: Jan Henrik Wilhelm Kuhlefelt, Beijing (CN)

(73) Assignee: PFISTERER KONTAKTSYSTEME GMBH, Winterbach (DE)

( * ) Notice: Subject to any disclaimer, the term of this patent is extended or adjusted under 35 U.S.C. 154(b) by 0 days.

(21) Appl. No.: 15/111,498

(22) PCT Filed: Dec. 19, 2014

(86) PCT No.: PCT/EP2014/003444
§ 371 (c)(1),
(2) Date: Jul. 14, 2016

(87) PCT Pub. No.: WO2015/106791
PCT Pub. Date: Jul. 23, 2015

(65) Prior Publication Data
US 2016/0352036 A1     Dec. 1, 2016

(30) Foreign Application Priority Data
Jan. 15, 2014    (DE) .................. 10 2014 000 694

(51) Int. Cl.
*H01R 13/44*     (2006.01)
*H01R 13/53*     (2006.01)
(Continued)

(52) U.S. Cl.
CPC ........... *H01R 13/44* (2013.01); *H01R 13/502* (2013.01); *H01R 13/5219* (2013.01); *H01R 13/53* (2013.01); *H02G 15/06* (2013.01)

(58) Field of Classification Search
CPC .. H01R 13/44; H01R 13/502; H01R 13/5219; H02G 15/06
(Continued)

(56) References Cited

U.S. PATENT DOCUMENTS 5,443,328 A    8/1995   Alcock et al.
5,807,129 A *   9/1998   Konda ............... H01R 13/6271
                                                              439/348
(Continued)

FOREIGN PATENT DOCUMENTS

DE     41 39 100     1/1993
DE     42 39 648     6/1994
(Continued)

OTHER PUBLICATIONS

International Search Report (ISR) dated Mar. 25, 2015 in International (PCT) Application No. PCT/EP2014/003444.

*Primary Examiner* — Harshad C Patel
(74) *Attorney, Agent, or Firm* — Wenderoth, Lind & Ponack, L.L.P.

(57) ABSTRACT

A high-voltage cable plug (1) for installing on an end of a high-voltage cable (20) has an insulating part (14) attached to the end of the high-voltage cable (20). The insulating part is cone-shaped at least in some sections on the outer surface of the insulating part and can electrically tight contact a socket element (2) associated with the high-voltage cable plug (1) when the plug-in connection is established. The high-voltage cable plug (1) has a protective element (40) at or near the end of the high-voltage cable plug facing the socket element (2). The protective element protrudes beyond the end of the high-voltage cable plug (1) facing the socket element (2) in a radial direction, with respect to a longitudinal axis (10) of the high-voltage cable plug (1), to such an extent that the protective element (40) prevents damage to the high-voltage cable plug (1) or to the socket element (2)

(Continued)

when the high-voltage cable plug (1) is inserted into and removed from the socket element (2).

22 Claims, 4 Drawing Sheets (51) Int. Cl.
    *H01R 13/502* (2006.01)
    *H01R 13/52* (2006.01)
    *H02G 15/06* (2006.01)

(58) Field of Classification Search
    USPC .......................... 439/141, 271–275, 281, 89
    See application file for complete search history.

(56) References Cited

U.S. PATENT DOCUMENTS

| | | | |
|---|---|---|---|
| 7,195,505 B1 * | 3/2007 | Becker | H01R 13/5219 439/271 |
| 8,070,501 B2 * | 12/2011 | Kumar | H01R 13/111 439/186 |
| 2005/0112934 A1 * | 5/2005 | Zhao | H01R 13/641 439/489 |
| 2005/0260876 A1 * | 11/2005 | Krause | H01R 13/53 439/181 |
| 2009/0032283 A1 * | 2/2009 | Sjoberg | H01B 17/308 174/152 R |

FOREIGN PATENT DOCUMENTS

| | | |
|---|---|---|
| DE | 10 2004 054 639 | 6/2006 |
| EP | 0 429 734 | 6/1991 |
| FR | 2 221 837 | 10/1974 |
| WO | 92/12554 | 7/1992 |

* cited by examiner

HIGH-VOLTAGE CABLE PLUG

FIELD OF THE INVENTION

The invention relates to a high-voltage cable connector for mounting on one end of a high-voltage cable, in particular of a power supply high-voltage cable having an operating voltage of more than 72.5 kV.

BACKGROUND OF THE INVENTION

Such high-voltage cable connectors are disclosed in DE 10 2004 054 639 A1, for example. The high-voltage cable connector has an insulating part. The insulating part is made, for example, from a soft-elastic silicone, is tapered at least in sections on its outer surface and can be brought into electrically tight contact with a socket element, formed, for example, by mold casting, in particular with a tapered section of the socket element, when establishing the plug-in connection.

With regards to the application in high-voltage technology and associated power supply cables, such high-voltage cable connectors have external diameters of more than 10 cm or even more than 20 cm and a weight of several kilograms. Once the high-voltage cable connector has been mounted on the power supply cable, special attention has to be paid to the axial alignment of high-voltage cable connector and the socket element, for example, a device connection part, when connecting to the socket element and when subsequently disconnecting from the socket element, for example in the context of maintenance work. An offset of the axes or an inclination of the axes relative to one another must be avoided to reliably prevent any contact of the metallic end of the high-voltage cable connector facing the socket element with the socket element, in particular with the tapered section of the socket element, as any damage that occurs can reduce the operational reliability of the plug-in connection.

To ensure proper connection and disconnection, auxiliary devices are used, for example, pulleys, to ensure an axially aligned connection. However, in some cases connection takes place in constricted installation conditions, for example, in narrow cable ducts or building penetrations, rendering an axially aligned connection more difficult. In addition, the minimum possible and permissible bending radiuses of the high-voltage cables increase correspondingly with increasing cable diameters so that, even using a cable hoist, a perfect axis-symmetrical alignment of the cable connector with the high-voltage cable mounted thereon on the one hand, and with the socket element on the other hand, cannot be guaranteed under all conditions. The minimum permissible bending radius of a high-voltage cable usually equals 20 times the cable diameter, for values below this, the functional reliability of the cable can be affected.

SUMMARY OF THE INVENTION

The invention addresses the problem of providing a high-voltage cable connector for a power supply high-voltage cable, which can be connected and disconnected using little effort, while ensuring a high contact reliability and operational reliability and which, in particular, reliably prevents the risk of damage during connection to and disconnection from the associated socket element.

This problem is basically solved by a high-voltage cable connector according to the invention.

In one embodiment, the high-voltage cable connector has a protective element on or near its end facing the socket element. The protective element protrudes beyond the end of the high-voltage cable connector facing the socket element in a radial direction, relative to the longitudinal axis of the high-voltage cable connector, to such an extent that the protective element prevents damage to the high-voltage cable connector or to the socket element when the high-voltage cable connector is inserted into the socket element. The protective element is preferably made from an electrically insulating and, in particular, non-metallic, material, and preferably has an outer surface without edges. The protective element prevents an, in particular sharp-edged, metallic component of the high-voltage cable connector from coming into contact with the socket element, in particular with the conically formed inner surface of the socket element, when the high-voltage cable connector and the socket element are connected to and disconnected from one another. This design reliably prevents, for example, any scratching of the inner surface of the insulating material and/or any deposits of conductive particles in the electrically effective joint between the socket element and the insulating part of the high-voltage cable connector. The connector solution according to the invention is used in particular for the connection of the cable to electrical equipment, such as connections to gas-insulated switchgear or oil-filled transformers, for example.

The protective element is preferably made from a material, which slides well on the material of the socket element and, in particular, which has a low coefficient of sliding friction and a low coefficient of static friction relative to the material of the socket element.

The protective element should preferably deform only slightly, and/or no particles should be detachable from the protective element. The sliding film applied onto the inner surface of the socket element, in particular to the tapered inner surface, is preferably displaced as little as possible by the protective element, even if the protective element is in contact with the inner surface. A dimensional stability of the protective element up to an operating temperature of at least 120° C. is desirable, at which temperature the sliding properties of the protective element on the socket element material should also be maintained, for example for disconnecting the plug-in connection.

In one embodiment, the protective element is made from a thermoplastic synthetic material. Advantageously, such synthetic materials are not entropy-elastically, but rather energy-elastically deformable, and thus, have good sliding properties on the material of the socket element. Tests have found that, in particular, the synthetic material polyoxymethylene (POM) is particularly suitable, not only with regard to its thermal resistance and dimensional stability, but also with regard to the thermal expansion properties and, in particular, the sliding properties and abrasion properties in coaction with the socket element. Furthermore, no chemical interactions exist with the pasty, silicone-based lubricant applied onto the inner surface of the socket element.

In one embodiment, the protective element is annular and at least sections of its outer surface are cylindrical or tapered. In particular, the section of the protective element facing the socket element, and thus, the section facing away from the insulating part, can be rounded, while the section of the protective element facing away from the socket element and thus facing the insulating part can be formed cylindrical. This arrangement prevents both mechanical damage to the inner surface of the socket element and undesirable displacement of the lubricant on the inner surface of the socket element.

In one embodiment, the high-voltage cable connector has a contact element, which, in the connected state, establishes the electrical connection between the conductor of the high-voltage cable and a contact element of the socket element. The contact element can have a contact carrier and at least one contact device, for example, one contact device, which establishes a multi-line contact with the contact element of the socket element. The contact element can be disposed along the longitudinal axis of the high-voltage cable connector between the insulating part and an end of the high-voltage cable connector facing the socket element or between the insulating part and one end of the conductor of the high voltage cable.

In one embodiment, the protective element is annular and has a shoulder on its inner surface. This shape allows the protective element to be simply and securely mounted or slid onto the contact element at the end. The shoulder on the inner surface can also be used to engage the protective element on the contact element if the contact element is correspondingly formed, for example, if a ridge adapted in terms of its shape and dimensions to the shoulder is on the inner surface of the protective element or if a corresponding recess is provided.

In one embodiment, the protective element is mounted axially on one of the ends of the contact element, in particular on the end of the contact element facing away from the insulating part. The protective element can then be easily attached on the contact element, if appropriate, even in a state in which the contact element is not yet connected to the high-voltage cable.

In one embodiment, the contact element has a circumferential groove on or near its end facing away from the insulating part on the outer face, into which the protective element can be introduced. For example, the protective element can engage in the groove of the contact element in a non-detachable manner. As a result, the protective element is non-detachably mounted on the high-voltage cable connector, in particular on the contact element.

In one embodiment, a ridge delimits the groove in the direction of the end of the contact element facing away from the insulating part, tapers in the direction of the end of the contact element facing away from the insulating part, and is, in particular, tapered or rounded on the outer face. This shape simplifies mounting the protective element on the contact element.

In one embodiment, the high-voltage cable connector has a clamping cone. The inner face of the clamping cone faces the conductor of the high-voltage cable and is electrically connected to the conductor. Its outer face faces the contact element and is electrically connected to the contact element. For example, the clamping cone can be mounted on the conductor of the high-voltage cable, and/or the contact element can be mounted on the outer face of the clamping cone. The clamping cone can, for example, be deformable in a spring elastic manner due to slots that extend in the longitudinal direction and that are preferably not continuous and can be pressed onto the conductor of the high-voltage cable by the contact element, in particular by a sleeve-shaped contact carrier of the contact element.

In one embodiment, the clamping cone protrudes beyond the contact element in the direction of the end of the high-voltage cable facing the socket element, and thus, facing away from the insulating part. The protective element or an additional protective element can also cover the clamping cone, and can in particular cover the end of the clamping cone facing the socket element. Such a protective element can, for example, also be mounted in the slots in the clamping cone and can then be easily attached to the high-voltage cable connector.

Protective elements can also be designed as a partial coating with an insulating varnish, which fully or partially covers all surfaces of potential contact between the contact ring and clamping cone and the socket element. The partial coating does not comprise the inner face of the clamping cone. No joints may be created when the clamping cone and contact ring are assembled, or the contact device.

In one embodiment, a theoretical alignment, which is defined by the radial outer face of the protective element on the one hand and, on the other hand, by the metallic end of the high-voltage cable connector facing the socket element, encloses an angle with the longitudinal axis of the high-voltage cable connector. This angle is larger than the taper angle of the insulating part of the high-voltage cable connector. The metallic end of the high-voltage cable connector facing the socket element can, for example, be formed by the end of the clamping cone protruding beyond the contact element facing the socket element. In practice, with such an angle arrangement, the risk of damage to the tapered inner surface of the socket element is virtually eliminated.

In one embodiment, the high-voltage cable connector has an operating voltage of more than 72.5 kV, in particular at least or even more than 170 kV. Even for such large-volume high-voltage cable connectors, the protective element according to the invention reliably prevents damage to the high-voltage cable connector and, in particular, to the socket element, during mating and disconnecting.

The features mentioned in this description can be essential to the invention either individually or in any combination.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
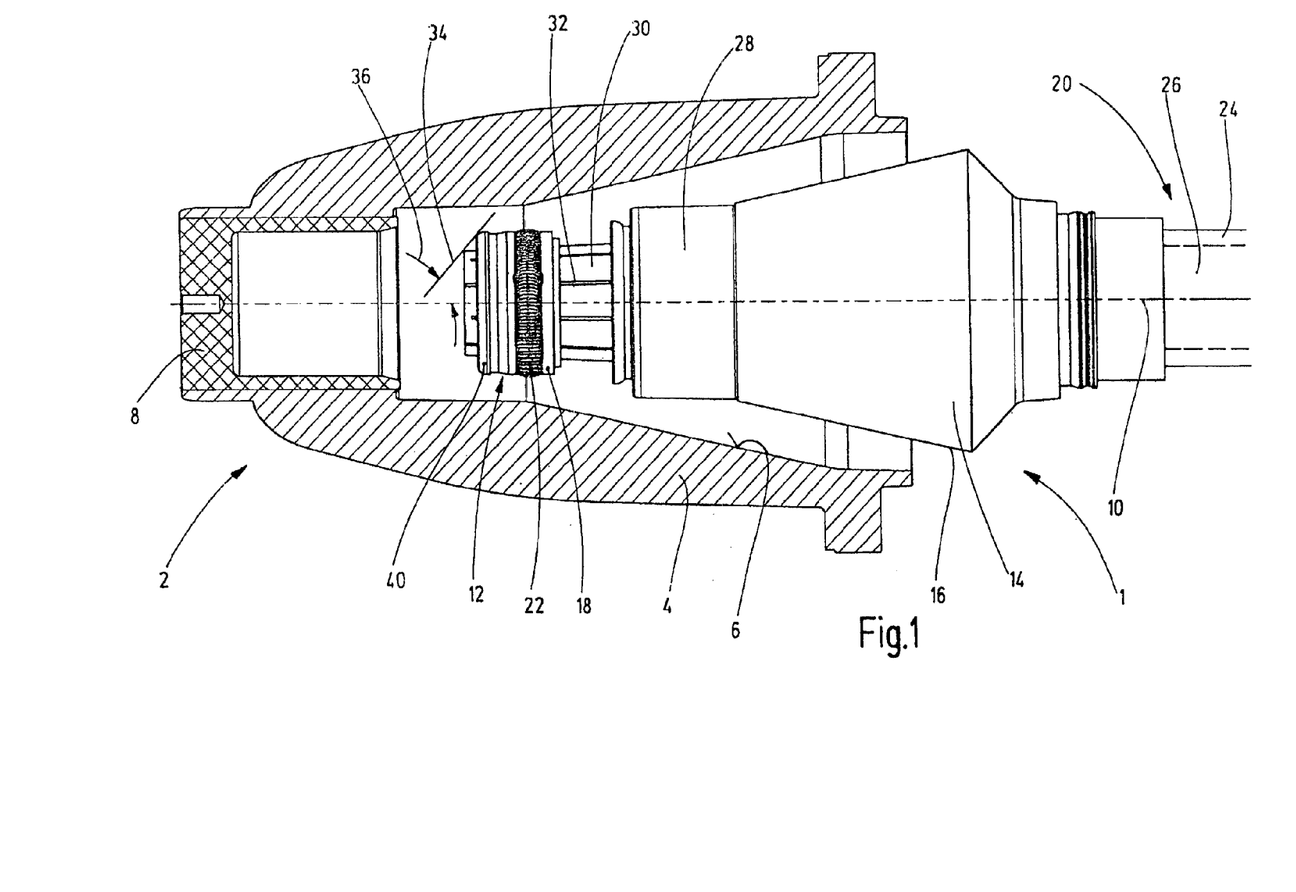
FIG. 1 is a side view in partial section of a high-voltage cable connector according to a first exemplary embodiment of the invention.

FIG. 1 shows a side view of a not fully depicted high-voltage cable connector 1, which is partially, but not yet fully inserted into a socket element 2 depicted in cross-section. With regard to the high-voltage cable connector 1, in particular the flange bell, by which the high-voltage cable connector 1 can be detachably attached to the socket element 2, is not depicted. The socket element 2 has an electrically insulating socket element body 4 made, for example, from a casting resin, forming an inner cone 6 in sections. A metallic contact element 8 is cast into the socket element body 4, which contact element forms a hollow cylindrical receptacle for the insertion of the contact element 12 of the high-voltage cable connector 1. Both the high-voltage cable connector 1 and the socket element 2 are essentially symmetrical to the longitudinal axis 10 or to a symmetry plane passing through the longitudinal axis 10.

The high-voltage cable connector 1 has an insulating part 14 that can be mounted on the end of the high-voltage cable 20. The insulating part 14 has an outer cone 16 in sections on its outer surface that can be brought into electrically tight contact with the inner cone 6 of the socket element 2 when the high-voltage cable connector 1 is fully inserted into the socket element 2. Embodiments in which the insulating part 14 of the high-voltage cable connector 1 forms an inner cone and the socket element 2 forms the corresponding outer cone are also possible.

The high-voltage cable connector 1 has a contact element 12 which, in turn, has a contact carrier 18 and a contact device or contact 22. In the exemplary embodiment, the contact device is annular and has a plurality of punctiform or linear contact points in the circumferential direction for the contact on the contact element 8 of the socket element 2.

When the high-voltage cable connector 1 is mounted on the high-voltage cable 20, the insulating part 14 is slid onto the conductor insulation 24 of the high-voltage cable 20 until the high-voltage cable 20 with a part of the conductor insulation 24 and one end of the conductor 26, which connects to same in the direction of the socket element 2 and which is freed from the conductor insulation 24, protrudes at one end of the insulating part 14 facing the socket element 2. A pressure piece 28 is then slid onto the conductor insulation 24 protruding from the insulating part 14. The conductor 26, onto which conductor a clamping cone 30 is slid until it contacts on the pressure piece 28, also protrudes from the pressure piece 28 in the direction of the socket element 2.

The clamping cone 30 preferably has several longitudinal slots 32, which extend in the longitudinal direction but which are not continuous. By slot 32, the clamping cone 30 has an essentially cylindrical inner surface can be brought into electrical contact with the conductor 26. On the outer face, the clamping cone 30 forms a cone envelope surface, onto which surface the sleeve-shaped contact element 12 can be slid. The contact element 12 has, on its inner face, a potentially even multiple-stage inner cone and preferably has, on its end facing away from the pressure piece 28, a cylindrical section. The clamping cone 30 is pressed onto the conductor 26 by sliding the contact element 12 on. How far the contact element 12 can be slid on the clamping cone 30 in the direction of the longitudinal axis 10 depends on the cross-sectional diameter of the conductor 26.

The high-voltage cable connector 1 is preferably not usable for only a certain cross-sectional area of the conductor 26, but rather for a certain range of cross-section areas, and thus, for different cross-sectional areas of the conductor 26, which is why the axial position of the contact element 12 on the clamping cone 30 can vary. In the exemplary embodiment of FIG. 1, a position of the contact element 12 near the end of the high-voltage cable connector 1 or its clamping cone 30 is shown. In the exemplary embodiment depicted in FIG. 2, the high-voltage cable 120 has a conductor 126 having a small cross-section area, so that the contact element 12 can, or even must, be slid further onto the clamping cone 30, and is thus disposed further away from the end of the clamping cone 30 facing the socket element 2.

To reliably prevent the high-voltage cable connector 1 contacting the socket element 2, in particular the inner cone 6 thereof, when the high-voltage cable connector 1 is inserted into the socket element 2 and in the case of large diameters of the high-voltage cable 20 and associated relatively large bending radiuses and more complex manageability, the high-voltage cable connector 1 has, near its end facing the socket element 2, a protective element 40. Protective element 40 protrudes to a sufficient extent beyond the end of the high-voltage cable connector 1 facing the socket element 2 in a radial direction, relative to the longitudinal axis 10.

Figure 2:
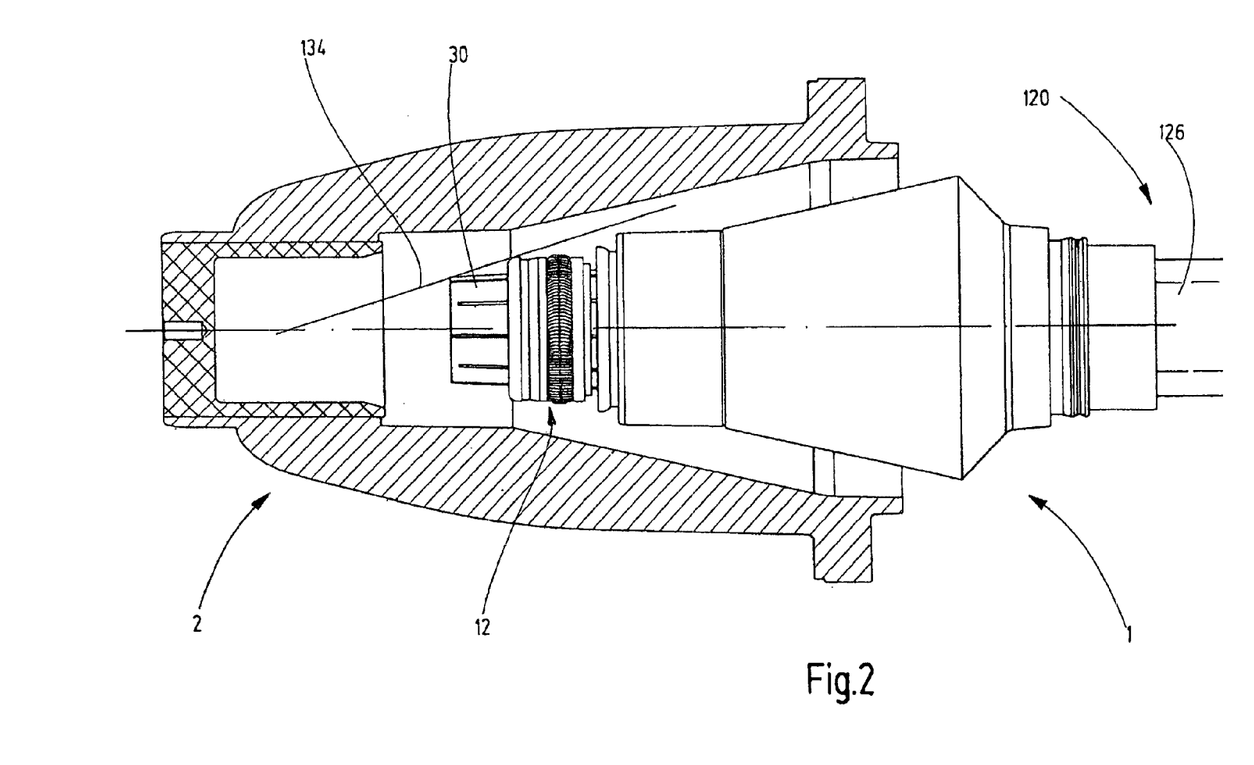
FIG. 2 is a side view in partial section of a high-voltage cable connector according to a second exemplary embodiment of the invention, in which the contact element is slid further onto the clamping cone.

In the depicted exemplary embodiment, the protective element 40 is annular and mounted axially at the end on the contact element 12. Damage to the socket element 2 and/or to the high-voltage cable connector 1 can be particularly reliably prevented if the alignment 34, 134, which is guided tangentially to the radial outer face of the protective element 40 starting from a metallic end of the high-voltage cable connector 1 facing the socket element 2 and, in the depicted exemplary embodiment, starting from the radial outer edge of the clamping cone 30 on its end facing the socket element 2, encloses an angle 36 with the longitudinal axis 10 that is greater than the angle the outer cone 16 encloses with the longitudinal axis 10.

Figure 3:
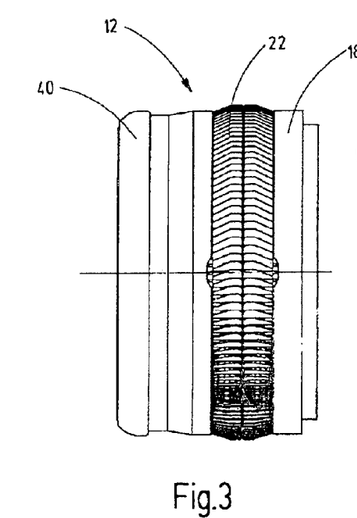
FIG. 3 is a side view of the contact element of FIGS. 1 and 2.
Figure 4:
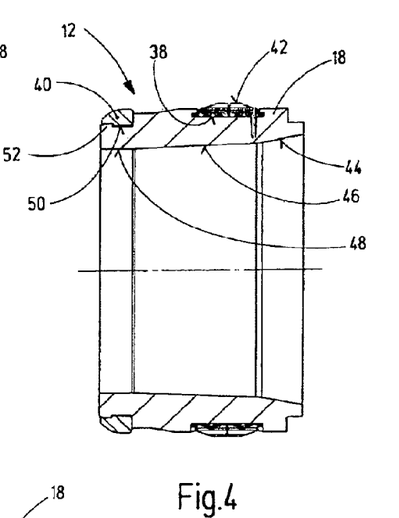
FIG. 4 is a side view in section of the contact element of FIG. 3.
Figure 5:
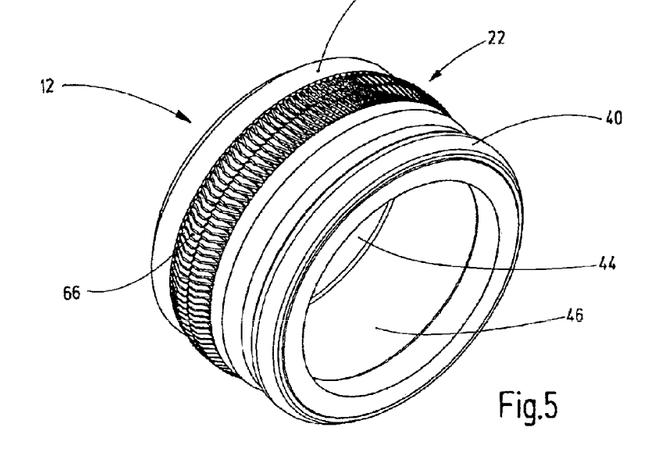
FIG. 5 is a perspective view of the contact element of FIG. 3.

FIG. 3 shows a side view of the contact element 12, FIG. 4 shows a longitudinal section through the contact element 12, and FIG. 5 shows a perspective view of the contact element 12.

The contact device or contact 22 is inserted on the outer face of the contact carrier 18 into a groove 38 therein and extends in an annular manner. The contact edges 42 of contact device 22 are formed by a plurality of contact plates 66 extending essentially axially and disposed consecutively in the circumferential direction. The contact device 22 protrudes radially over or beyond the outer surface of the contact carrier 18 connecting to the groove 38.

On its inner face, the contact carrier 18 firstly has, on its end facing the pressure piece 28, a first inner cone 44. Cone 44 simplifies mounting the contact carrier 18 or the contact element 12 on the clamping cone 30. In addition, the contact carrier 18 has a second inner cone 46 on the inner face, the taper angle of which is adapted to the external taper of the clamping cone 30 and, in particular, largely coincides with it. In the area of the second inner cone 46, the contact device 22 is disposed on the outer face on the contact carrier 18.

In the direction of the end facing the socket element 2, the contact carrier 18 has, on the inner face, an essentially cylindrical section 48. In the area of cylindrical section 48, the protective element 40 is disposed on the outer face on the contact carrier 18. For this purpose, the contact carrier 18 has, on the outer face, a circumferential groove 50, in which the protective element 40 engages or can be inserted. In the direction of the axial end of the contact carrier 18, the groove 50 is delimited by a flange-shaped ridge 52, which tapers in the direction of the end of the contact element 12 or of the contact carrier 18 facing the socket element 2, and which tapers in a conical manner in the exemplary embodiment.

Figure 6:
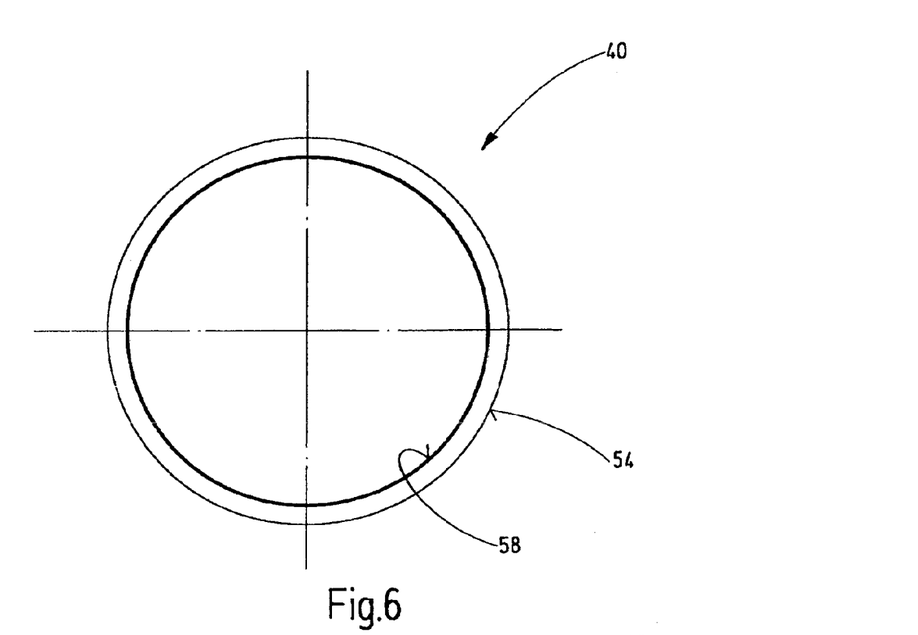
FIG. 6 is a rear view of the protective element of FIGS. 3 and 4.
Figure 7:
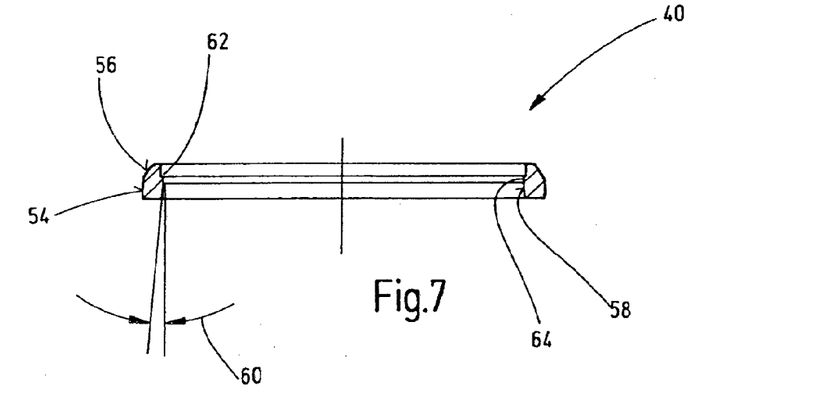
FIG. 7 is a side view in section through the protective element of FIG. 6.

FIG. 6 shows a rear view of the protective element 40. FIG. 7 shows a section through the protective element 40. In the exemplary embodiment, the protective element 40 is made from a thermoplastic synthetic material, preferably from polyoxymethylene (POM). The annular protective element 40 has, on its outer surface, a cylindrical section 54 and, connected thereto, a rounded section 56. In the area of the cylindrical section 54 formed on the outer face, the protective element has a tapered surface 58 on the inner face. The taper angle 60 is 3° to 12°, in particular 5° to 8°, and is approximately 6.5° in the exemplary embodiment. The taper angle 60 can essentially coincide with the outer cone formed by the ridge 52 of the contact carrier 18 at the end.

On its inner surface, the protective element 40 has a shoulder 62, preferably having a rectangular contour. By the shoulder 62, the protective element 40 can be attached by engaging in the groove 50 of the contact carrier 18. For this purpose, advantageously an essentially cylindrical section 64 adjoining the shoulder 62 connects to the tapered surface 58 on the inner face.

In the depicted exemplary embodiment, the external diameter of the protective element 40 is approximately 100 mm, and the high-voltage cable connector 1 is provided for operating voltages of more than 170 kV.

While various embodiments have been chosen to illustrate the invention, it will be understood by those skilled in the art that various changes and modifications can be made therein without departing from the scope of the invention as defined in the claims.

The invention claimed is:

1. A high-voltage cable connector for mounting on one end of a high-voltage cable, the high-voltage cable connector comprising:
   an insulating part being mounted on the end of the high-voltage cable and being tapered at least in sections of an outer surface thereof, the high-voltage cable connector being connectable in electrically tight contact with a socket element assigned to the high-voltage cable connector when establishing a plug-in connection between the high-voltage cable connector and the socket element;
   a protective element at least one of on or adjacent a connector end of the high-voltage cable connector that faces the socket element during the plug-in connection, said protective element protruding beyond said connector end in a radial direction relative to a longitudinal axis of the high-voltage cable connector to an extent that said protective element prevents damage to the high-voltage cable connector or to the socket element when the high-voltage cable connector is inserted into and removed the socket element, said protective element being annular and having a shoulder on an inner surface thereof.

2. A high-voltage cable connector according to claim 1 wherein
   said protective element is at least one of tapered or cylindrical in sections of an outer surface thereof.

3. A high-voltage cable connector according to claim 1 wherein
   a contact establishes an electrical connection between a conductor of the high-voltage cable and a contact element of the socket element when the plug-in connection is established.

4. A high-voltage cable connector according to claim 3 wherein
   said protective element is mounted axially at an end of said contact.

5. A high-voltage cable connector according to claim 3 wherein said contact comprises a circumferential groove adjacent an end of the high-voltage cable connector facing the socket element and on an outer face thereof, said protective element being mounted in said groove.

6. A high-voltage cable connector according to claim 5 wherein
   a ridge delimits said groove in a direction of said end of said contact, tapers in a direction of said end of said contact, and has a radial outer face that is at least one of tapered or rounded.

7. A high-voltage cable connector according to claim 6 wherein
   an alignment is defined tangentially by said radial outer face of said protective element starting from a metallic end of the high-voltage cable connector facing the socket element, and encloses an angle with said longitudinal axis greater than a taper angle of an outer cone of said insulating part.

8. A high-voltage cable connector according to claim 1 wherein
   said protective element is made from a thermoplastic synthetic material.

9. A high-voltage cable connector according to claim 1 wherein
   a clamping cone has an inner face facing a conductor of the high-voltage cable, being electrically connectable to the conductor and being mountable on the conductor, and has an outer face being electrically connected to said contact and being mounted on and inner face of said contact.

10. A high-voltage cable connector according to claim 9 wherein
    said of clamping cone protrudes beyond said contact in a direction of an end of the high-voltage cable facing the socket element.

11. A high-voltage cable connector according to claim 1 wherein
    the high-voltage cable connector has an operating voltage of more than 72.5 kV.

12. A high-voltage cable connector according to claim 11 wherein
    said operating voltage is at least 170 kV.

13. A high-voltage cable connector for mounting on one end of a high-voltage cable, the high-voltage cable connector comprising:
    an insulating part being mountable on the end of the high-voltage cable and being tapered at least in sections of an outer surface thereof, the high-voltage cable connector being connectable in electrically tight contact with a socket element assigned to the high-voltage cable connector when establishing a plug-in connection between the high-voltage cable connector and the socket element;
    an annular protective element at least one of on or adjacent a connector end of the high-voltage cable connector that faces the socket element during the plug-in connection, said protective element protruding beyond said connector end in a radial direction relative to a longitudinal axis of the high-voltage cable connector to an extent that said protective element prevents damage to the high-voltage cable connector or to the socket element when the high-voltage cable connector is inserted into and removed the socket element;
    a contact establishing an electrical connection between a conductor of the high-voltage cable and a contact element of the socket element when the plug-in connection is established, said protective element is mounted axially at an end of said contact; and an alignment being defined tangentially by a radial outer face of said protective element starting from a metallic end of the high-voltage cable connector facing the socket element, and enclosing an angle with said longitudinal axis greater than a taper angle of an outer cone of said insulating part.

14. A high-voltage cable connector according to claim 13 wherein said protective element is at least one of tapered or cylindrical in sections of an outer surface thereof.

15. A high-voltage cable connector according to claim 13 wherein said protective element is annular and comprises a shoulder on an inner surface thereof.

16. A high-voltage cable connector according to claim 13 wherein said protective element is made from a thermoplastic synthetic material.

17. A high-voltage cable connector according to claim 13 wherein said contact comprises a circumferential groove adjacent an end of the high-voltage cable connector facing the socket element and on an outer face thereof, said protective element being mounted in said groove.

18. A high-voltage cable connector according to claim 17 wherein a ridge delimits said groove in a direction of said end of said contact, tapers in a direction of said end of said contact, and has a radial outer face that is at least one of tapered or rounded.

19. A high-voltage cable connector according to claim 13 wherein a clamping cone has an inner face facing a conductor of the high-voltage cable, being electrically connectable to the conductor and being mountable on the conductor, and has an outer face being electrically connected to said contact and being mounted on and inner face of said contact.

20. A high-voltage cable connector according to claim 19 wherein said of clamping cone protrudes beyond said contact in a direction of an end of the high-voltage cable facing the socket element.

21. A high-voltage cable connector according to claim 13 wherein the high-voltage cable connector has an operating voltage of more than 72.5 kV.

22. A high-voltage cable connector according to claim 13 wherein said operating voltage is at least 170 kV.

\* \* \* \* \*